United States Patent
Stattenfield et al.

(10) Patent No.: US 10,863,338 B2
(45) Date of Patent: Dec. 8, 2020

(54) COPY AND PASTE BETWEEN DEVICES

(71) Applicant: Apple Inc., Cupertino, CA (US)

(72) Inventors: Keith Stattenfield, Cupertino, CA (US); Douglas R. Edmonson, Cupertino, CA (US); Marc Krochmal, Cupertino, CA (US); John J. Iarocci, Cupertino, CA (US); Kevin S. Perry, Cupertino, CA (US); David Rahardja, Cupertino, CA (US); Christopher S. Linn, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/748,631

(22) Filed: Jan. 21, 2020

(65) Prior Publication Data

US 2020/0162876 A1    May 21, 2020

Related U.S. Application Data

(63) Continuation of application No. 15/965,594, filed on Apr. 27, 2018, now abandoned, which is a
(Continued)

(51) Int. Cl.
*H04W 4/80* (2018.01)
*H04L 29/08* (2006.01)
(Continued)

(52) U.S. Cl.
CPC ............ *H04W 4/80* (2018.02); *G06F 3/0481* (2013.01); *G06F 9/543* (2013.01); *H04L 67/16* (2013.01);
(Continued)

(58) Field of Classification Search
CPC ... H04W 4/008; H04W 48/10; H04W 76/023; H04W 48/16; H04W 76/23; G06F 3/0481; H04L 67/306
See application file for complete search history.

(56) References Cited

U.S. PATENT DOCUMENTS 7,325,038 B1    1/2008  Wang
8,706,037 B1 *  4/2014  Hamilton .............. H04W 76/14
                                                    455/41.2
(Continued)

FOREIGN PATENT DOCUMENTS

EP      2723105 A1      4/2014
WO   2010/089458 A1     8/2010

OTHER PUBLICATIONS

Wikipedia, "Broadcasting (networking)," available online at <https://en.wikipedia.org/w/index.php?title=Broadcasting_(networking)&oldid=710762421>, Mar. 18, 2016, 3 pages.

*Primary Examiner* — Md K Talukder
(74) *Attorney, Agent, or Firm* — Invoke

(57) ABSTRACT

A device may comprise at least one wireless transceiver, a memory configured to store a local pasteboard, and a processor. The processor may be configured to receive local selections of data to be placed on a local pasteboard, broadcast advertisements indicating that the local data is on the local pasteboard, and wirelessly transmit the local data to remote device pasteboards. The processor may also be configured to receive advertisements indicating that remote data is available on remote pasteboards of other devices, request the remote data in response to a paste command, wirelessly receive the remote data, and paste the remote data.

20 Claims, 8 Drawing Sheets

Related U.S. Application Data continuation of application No. 15/191,165, filed on Jun. 23, 2016, now Pat. No. 9,967,697, which is a continuation of application No. 15/168,183, filed on May 30, 2016, now abandoned.

(51) Int. Cl.

| | | |
|---|---|---|
| *G06F 9/54* | (2006.01) | |
| *H04W 76/14* | (2018.01) | |
| *H04W 48/16* | (2009.01) | |
| *G06F 3/0481* | (2013.01) | |
| *H04W 48/10* | (2009.01) | |
| *H04W 84/12* | (2009.01) | |

(52) U.S. Cl.
CPC ........... *H04L 67/306* (2013.01); *H04W 48/10* (2013.01); *H04W 48/16* (2013.01); *H04W 76/14* (2018.02); *H04W 84/12* (2013.01)

(56) References Cited

U.S. PATENT DOCUMENTS

| | | | | |
|---|---|---|---|---|
| 8,725,808 | B2 * | 5/2014 | Puente | ............. H04L 67/06 709/204 |
| 8,948,148 | B2 | 2/2015 | Yu et al. | |
| 9,208,001 | B2 | 12/2015 | Paschke et al. | |
| 9,351,154 | B1 * | 5/2016 | Steve | ............. H04W 76/14 |
| 2012/0197727 | A1 * | 8/2012 | Kim | ............. G06Q 30/02 705/14.64 |
| 2013/0208109 | A1 * | 8/2013 | Landry | ............. G08B 13/19656 348/143 |
| 2014/0095673 | A1 | 4/2014 | Mao | |
| 2014/0188619 | A1 * | 7/2014 | Ravindran | ............. H04W 4/80 705/14.64 |
| 2014/0274031 | A1 | 9/2014 | Menendez | |
| 2015/0087231 | A1 * | 3/2015 | Sinha | ............. H04W 8/005 455/41.2 |
| 2015/0207850 | A1 * | 7/2015 | Jitkoff | ............. H04W 12/06 715/748 |
| 2015/0230285 | A1 * | 8/2015 | Park | ............. H04W 4/80 455/41.2 |
| 2015/0261414 | A1 * | 9/2015 | Ram | ............. H04L 67/06 715/733 |
| 2015/0327172 | A1 * | 11/2015 | Kusakabe | ............. H04W 36/0022 370/331 |
| 2015/0332258 | A1 * | 11/2015 | Kurabi | ............. G06Q 20/3278 705/71 |
| 2015/0350268 | A1 * | 12/2015 | Chang | ............. G06F 9/543 709/204 |
| 2016/0100275 | A1 * | 4/2016 | Viswanadham | .... H04L 45/7457 455/41.2 |
| 2016/0205496 | A1 * | 7/2016 | Su | ............. H04W 4/80 455/41.1 |

\* cited by examiner

US 10,863,338 B2

COPY AND PASTE BETWEEN DEVICES

INCORPORATION BY REFERENCE; DISCLAIMER

Each of the following applications are hereby incorporated by reference: application Ser. No. 15/965,594 filed on Apr. 27, 2018; application Ser. No. 15/191,165 filed on Jun. 23, 2016; application Ser. No. 15/168,183 filed on May 30, 2016. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to data transfer between devices.

BACKGROUND

Computing devices such as personal computers, smart phones, tablets, and other devices are commonly available, and in many cases, multiple computing devices may be in close proximity to one another. Sometimes a single user may use multiple computing devices in a short span of time. For example, the user may be using an application on a laptop and may switch to a tablet or smart phone to use a different application. In such cases, data transfer between the devices may not be straightforward, and may often require the user to perform tasks involving multiple steps and/or multiple applications on each of the devices.

SUMMARY

In some embodiments, computing devices may be configure to share contents of their clipboard or pasteboard with other computing devices. A user may select data in an application on a first device, such as text or graphics, for example, and enter a cut or copy command to place the data on the pasteboard. In addition to placing the data on the local pasteboard, this action may cause the first device to advertise the presence of the pasteboard data to other devices. The user may enter a paste command on a second device. This paste command may cause the second device to obtain the pasteboard data from the first device and paste the data into an application on the second device in much the same way as if the data had been captured into the second device's pasteboard from an application on the second device.

Particular implementations provide at least the following advantages: Users may seamlessly cut or copy data on one device and paste it on another device. Users may thereby transfer data between devices in proximity to one another that share a user account, for example. Transfers may occur transparently to the user. Transfers may be performed using low energy communications techniques. In cases where the data being transferred is large in size, transfers may be performed using high speed communications techniques, and/or a user interface indicating transfer progress and/or allowing user cancellation of the transfer may be provided.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Figure 1:
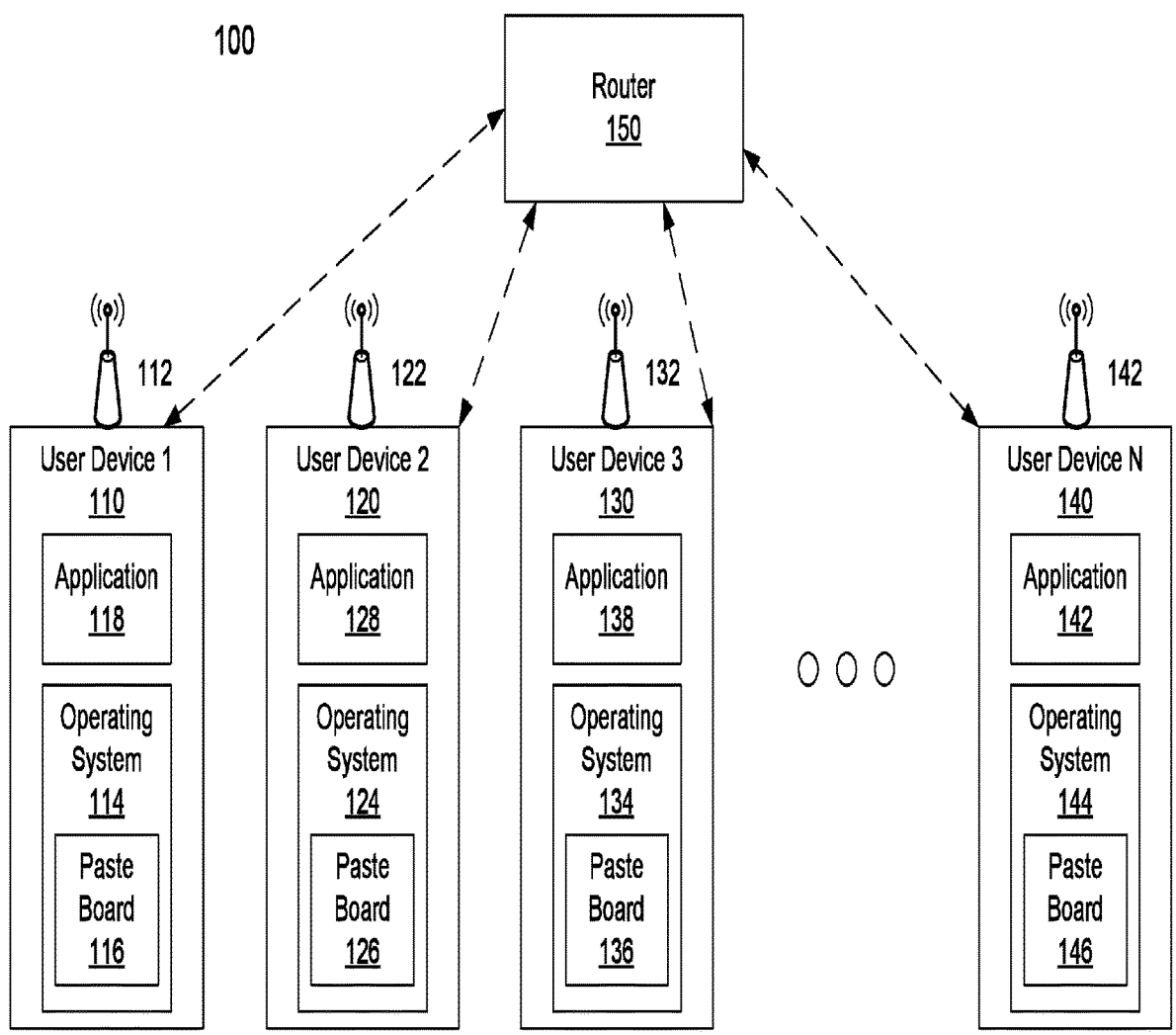
FIG. 1 is an example system for copying and pasting between devices.

FIG. 1 illustrates an example network 100 of computing devices. A computing device may be one of a variety of electronic devices including, but not limited to, laptop computers, desktop computers, computer terminals, television systems, tablet computers, e-book readers, smart phones, watches, and wearable computers. Two or more computing devices, such as device 1 (e.g., a laptop computer) 110, device 2 (e.g., a tablet) 120, device 3 (e.g., a smart phone) 130, and device N (e.g., a desktop computer) may be in proximity with one another. Each device may include at least one wireless transceiver 112/122/132/142, for example a Bluetooth low energy (BTLE) transceiver or other transceiver. Devices may be considered to be in proximity with one another when they are in communication range of one another through their respective BTLE transceivers. In addition to communicating with one another using BTLE, devices 110/120/130/140 may optionally connect with a local area network (LAN) using a wired or wireless router 150 or other networking device. For example, devices 110/120/130/140 may access the Internet or another wide area network (WAN) using the router 150.

Each device 110/120/130/140 may include an operating system 114/124/134/144 configured to facilitate general device operation and user interaction with the device. The operating system 114/124/134/144 may include a pasteboard 116/126/136/146. The pasteboard 116/126/136/146 may be a portion of device 110/120/130/140 memory, a file in a file system of device 110/120/130/140, or some other data storage element, configured to store data and facilitate cut, copy, and/or paste operations. In some embodiments, the pasteboard 116/126/136/146 may be provided by a separate application from the operating system itself. Each device 110/120/130/140 may also run one or more applications 118/128/138/148. A user may cut and/or copy data from an application, causing the data to appear on the pasteboard. The user may paste the data in the pasteboard into the same application or a different application from which the data originated.

Figure 2:
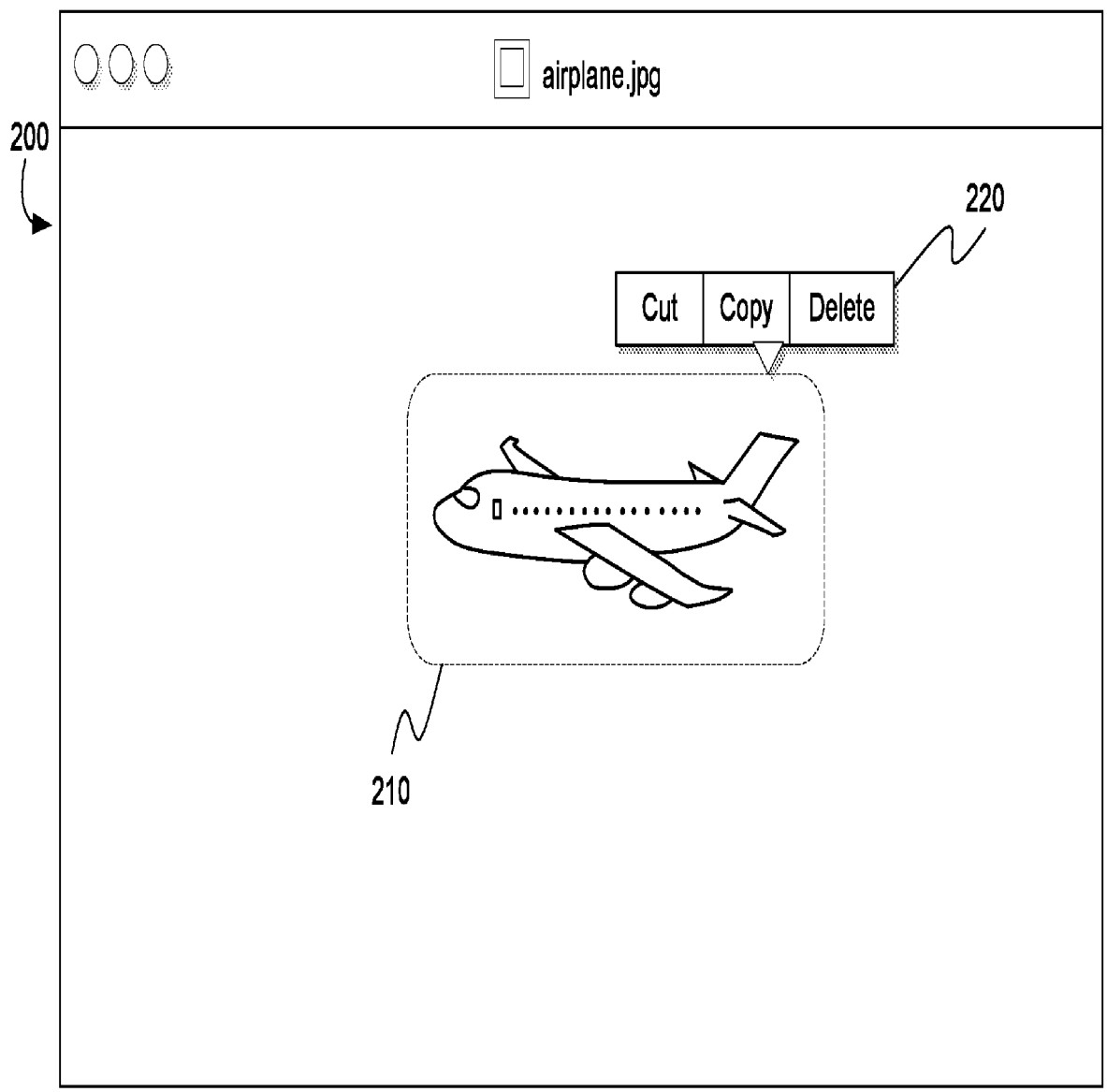
FIG. 2 is an example graphical user interface for copying and pasting between devices.

FIG. 2 illustrates an example graphical user interface (GUI) 200 which may be displayed on a device (e.g., tablet 120 of network 100 or any other device). A user may interact with the tablet 120 to select data 210, for example an image or a portion of an image. The selection may prompt the tablet 120 to present a menu 220 including cut, copy, and other options. When a user selects cut or copy, the selected data 210 may be placed on the pasteboard 126. In this example, the GUI 200 is an interface for an image viewing or editing application 128, although a GUI providing similar functionality may be provided for other applications as well.

Figure 3:
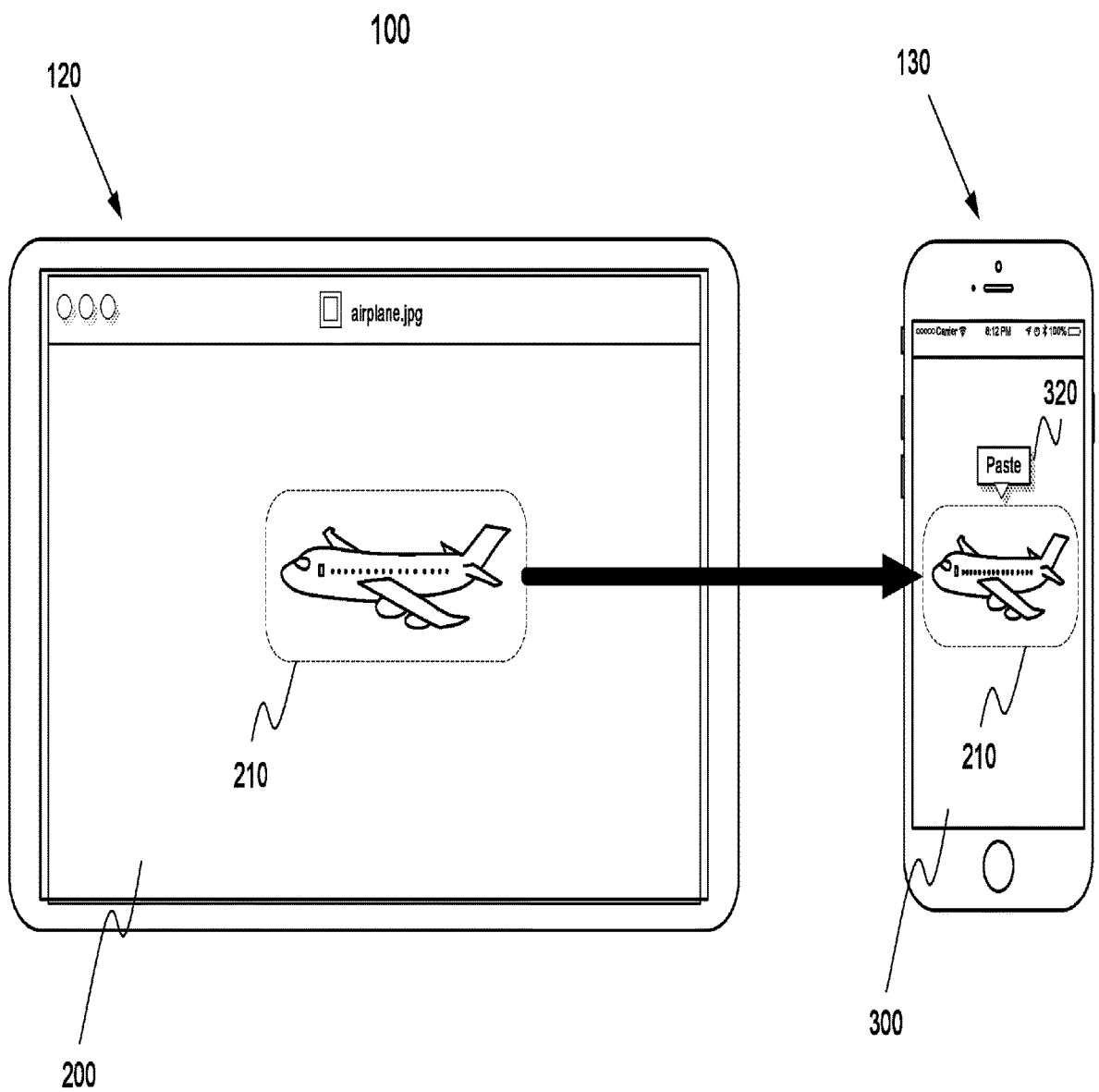
FIG. 3 is an example data transfer mechanism for copying and pasting between devices.

FIG. 3 illustrates an example of copying data on a first device (e.g., tablet 120 of network 100) and pasting it on a second device (e.g., smart phone 130 of network 100). As described with respect to FIG. 2, a user may copy selected data 210 using a menu 220 of a GUI 200 of the first device 120. Then, the user may interact with a GUI 300 of the second device 130 to enter a paste command (e.g., through paste menu 320 or using some other command). As described in greater detail below, the second device 130 may learn of the data on the first device's pasteboard 126, receive the data, and add the data to the second device's pasteboard 136. The paste command may paste the data that originated on the first device 120 into an application 128 of the second device 130. The data that originated on the first device 120 may persist in the second device's pasteboard 136 as if it had been originally cut or copied using the second device 130. Issuing a paste command through paste menu 320 is shown as an example, but a user may trigger the remote paste in other ways. For example, after data is copied on the first device, and the first device advertises the availability of the data, the second device 130 may receive the advertisement and generate a prompt asking the user whether the data should be pasted onto the second device 130. In another example, a user may issue a command using a keyboard of the second device 130 (e.g., command-c or control-c).

Example Processes

Figure 4:
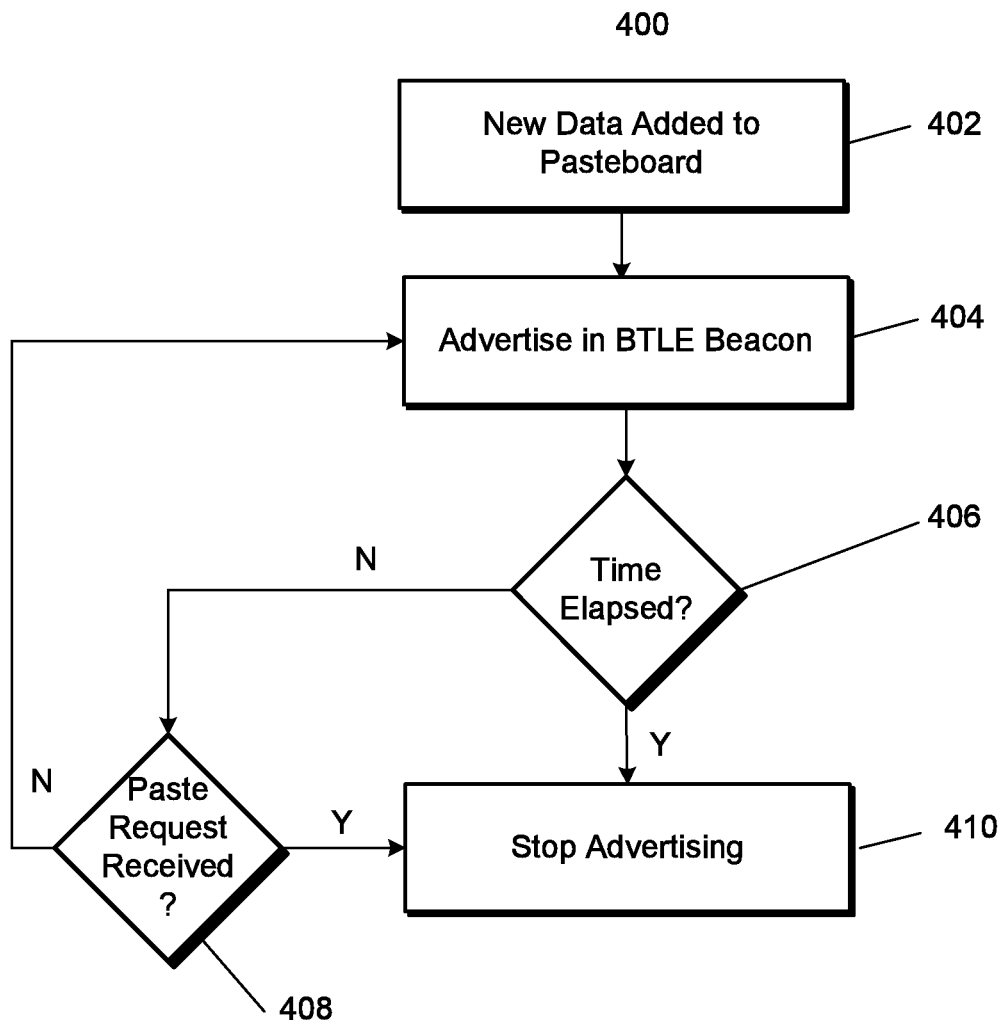
FIG. 4 is a flow diagram of an example process for advertising the availability of content for pasting from a first device to a second device.

FIG. 4 is a flow diagram of an example copy and advertise process 400 involving a first device 120. While this process 400 is presented as being performed by the first device 120, any device in network 100 may behave similarly when data is cut or copied on the device. The process 400 may begin when data is added to the device's pasteboard 402. For example, a user may select data within an application and enter a cut or copy command (e.g., through interaction with a GUI 200 as described above), causing device 120 to place the selected data on the pasteboard 126.

When data is added to the pasteboard 126, device 120 may advertise the presence of such data 404. For example, the advertisement may be inserted into BTLE beacon data also used by other processes. Some devices in network 100 may periodically transmit a handoff beacon payload. A handoff beacon may be, for example, a BTLE advertising packet periodically transmitted by device 120. The handoff beacon may include continuity data facilitating transfer of application operational states between devices. Other devices may likewise periodically transmit beacon data for similar functions or other reasons. The packet may include, for example, an activity identifier identifying a first application and the activity performed in the first application, a flag that is used to indicate when the activity identifier includes a representation of domain name for an online resource related to the activity, a timestamp for the activity/activity information, and/or other data. The advertisement may be inserted into a transmission including handoff beacon data or other beacon data. For example, the advertisement may be encoded into a handoff beacon advertising packet, and the same packet may be used to transmit both activity continuity data and pasteboard availability data. In some embodiments, the advertisement may be inserted into a periodically transmitted activity advertisement message of the type described in U.S. Publication No. 2015/0350355, entitled "Activity Continuation Between Electronic Devices," and U.S. Publication No. 2015/0373084, entitled "Forwarding Activity-Related Information From Source Electronic Devices to Companion Electronic Devices," the entirety of each of which is incorporated by reference herein.

The advertisement may be inserted 404 into beacon payloads sent by device 120 for a limited period of time. For example, after a predefined amount of time elapses 406 (e.g., 2 minutes or some other length of time), advertisement may no longer be added to subsequent beacon payloads 410. In some embodiments, the length of time may be a default length or may be a selectable length specified by a user through interaction with a GUI. Beacon payloads may be broadcast by device 120 without being intended for receipt by any specific other device (i.e., they may be advertised to any device that may happen to be listening).

In some cases, another device (e.g., second device 130) may request to paste data from the first device 120 pasteboard 126, and this request may be received 408 at first device 120. After the request is received, advertisement may no longer be added to subsequent beacon transmissions 410, and further processing (described below) may be performed by first device 120 and/or second device 130 to paste data on the second device 130. In other embodiments, first device 120 may continue to advertise the presence of pasteboard data for the remainder of the predetermined time period even after a paste request is received. This may allow additional devices (e.g., device 110 or device 140 of FIG. 1) to paste data from first device 120 pasteboard 126 as well.

Figure 5:
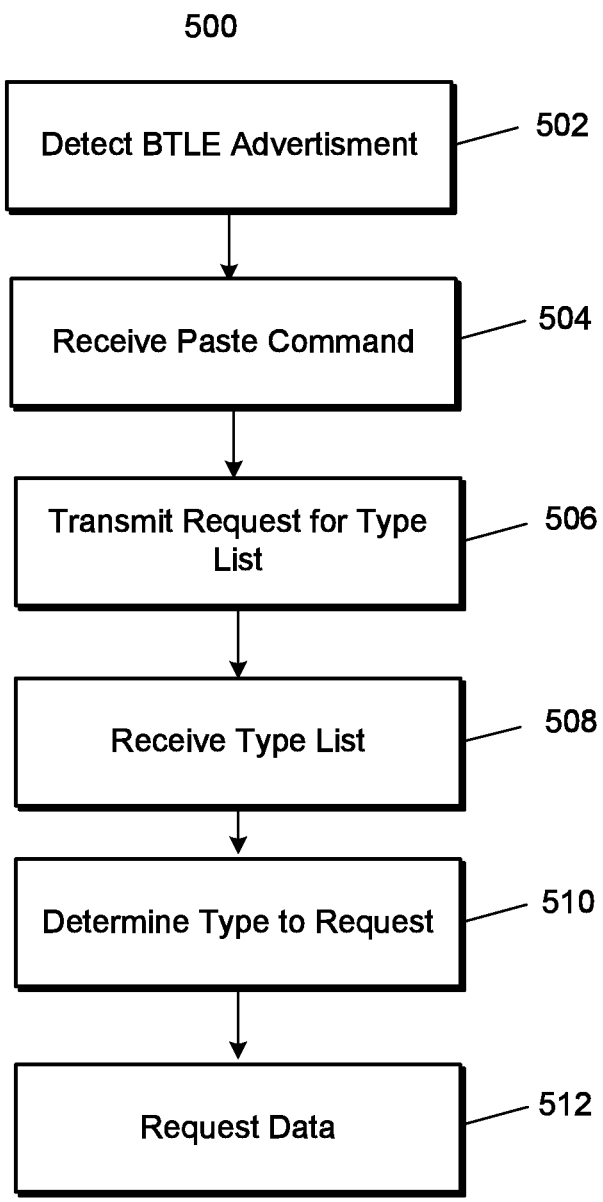
FIG. 5 is a flow diagram of an example process for requesting data to be pasted from another device.

FIG. 5 is a flow diagram of an example paste request process 500 involving a second device 130. While this process 500 is presented as being performed by the second device 130, any device in network 100 may behave similarly when a paste command is received on the device and another device in network 100 is broadcasting a beacon transmission including an advertisement. Second device 130 may receive the beacon transmission including the advertisement 502. In some embodiments, second device 130 may only process the advertisement and/or perform the following actions 504-512 when the second device 130 is associated with the same user account or other common identifier as the first device 120. For example, a user may have previously logged into a user account on both devices 120/130 (e.g., an Apple ID or other user account). In some embodiments, devices 120/130 may encrypt data exchanged between one another so that only devices associated with the same user account or other common identifier may decrypt and use the data. In some embodiments, second device 130 may only process the advertisement and/or perform the following actions 504-512 when shared copy and paste functionality is enabled in a user account setting and/or device setting. Such settings may be user-selectable through interaction with a GUI or may be default settings, for example.

Second device 130 may receive a paste command (e.g., through interaction with GUI 300 as described above) 504 during the time period in which the advertisement is being broadcast by first device 120 and received by second device 130. Given that the two devices 120/130 are associated with the same user account, and given that the paste command is received shortly after the data is added to the first device 120 pasteboard 126 (e.g., during the time period in which the advertisement is being broadcast by first device 120 and received by second device 130), it may be assumed that the user intends to transfer pasteboard 126 content to second device 130 pasteboard 136 and paste it. Second device 130 may send a request for more information to first device 120 with BTLE or other connection 506; For example, second device 130 may request a type list for the data on first device 120 pasteboard 126. The type list may include information about the type of data available on pasteboard 126 and/or information about the size of the data. For example, if text was cut or copied onto pasteboard 126, the type list may include plain text and rich text entries for the text data. If an image was cut or copied onto pasteboard 126, the type list may include a variety of image formats (e.g., .gif, .jpg, .png, etc.) for the image data. Allowing the second device 130 to request type data, rather than including it in the advertisement, may reduce advertisement bit size requirements in some embodiments. However, in some embodiments, the advertisement may include type data, allowing actions related to requesting and receiving type data described herein to be omitted.

In some embodiments, more than one device associated with the user account (e.g. first device 120 and a third device 110) may broadcast advertisements during the same time period in which the paste command is received 504. In this situation, second device 130 may send the request 506 to whichever device 110/120 sent an advertisement that was first detected by second device 130 most recently. That is, whichever device 110/120 started broadcasting the advertisement last. This may provide a user experience consistent with copying and pasting on a single device as is known in the art, wherein if a user copies first data, and then copies second data without pasting first data, the second data is the data that is eventually pasted. In some embodiments, the advertisements may include time stamps indicating when the data was initially cut or copied which may be used by second device 130 to select the newest data.

Figure 6:
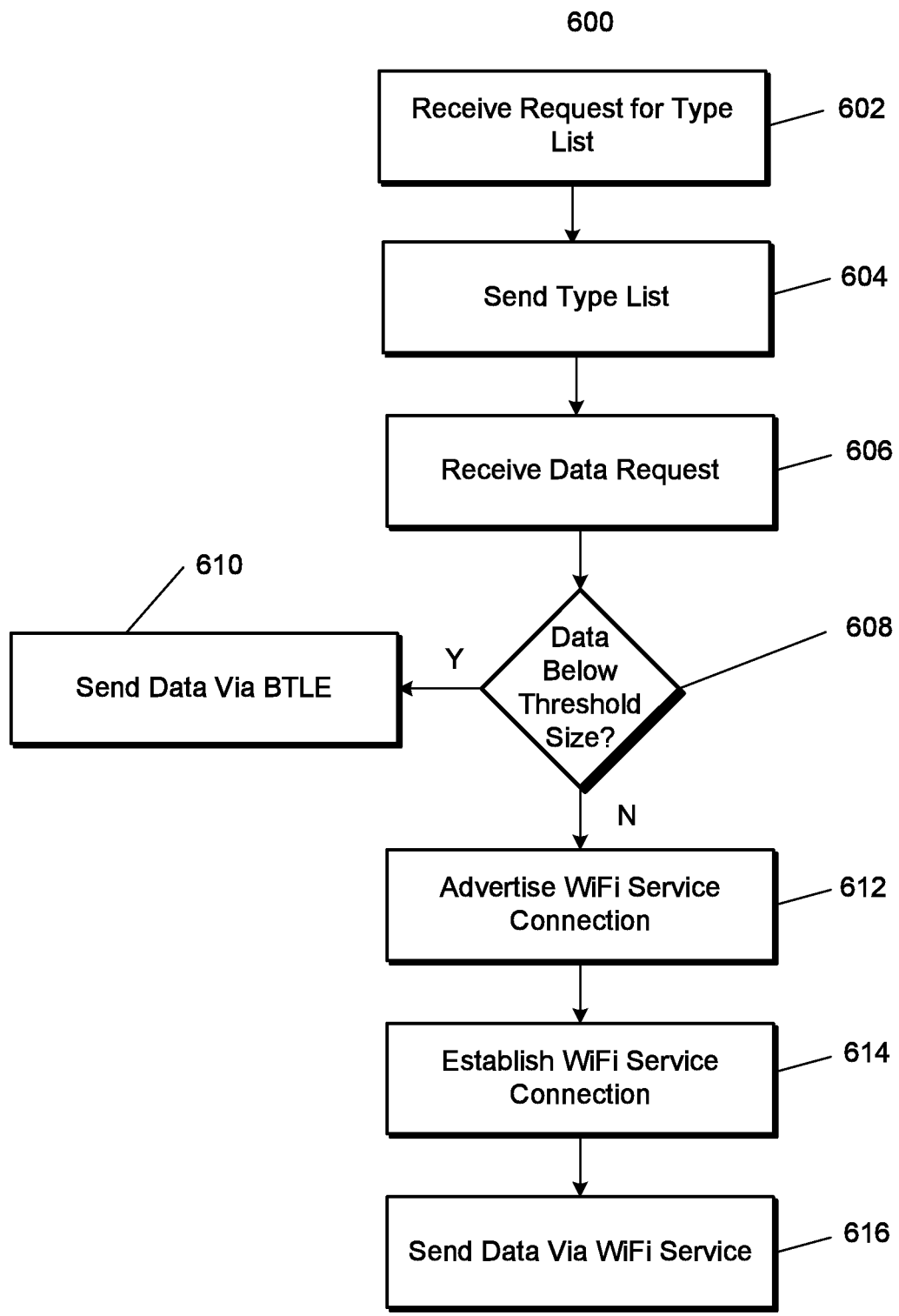
FIG. 6 is a flow diagram of an example process for sending cut or copied data to another device.

First device 120 may receive the request for the type list and send the type list in response (see FIG. 6). Second device 130 may receive the type list through BTLE or other connection 508. Second device 130 may examine the type list to determine which type(s) of data to request 510. For example, some devices and/or applications may only be able to use a subset of the available data (e.g., only text and no graphics, only plain text and not rich text, only certain graphic or video or other file type formats, etc.). In these cases, second device 130 may determine that only a subset of the available types is to be requested. In other cases, second device 130 may determine that all types of available data are to be requested. Second device 130 may send a request for the determined data to first device 120 with BTLE or other connection 512. FIG. 6 is a flow diagram of an example data transfer process 600 involving a first device 120. While this process 600 is presented as being performed by the first device 120, any device in network 100 may behave similarly when requests for type lists and/or data transfers are received. First device 120 may receive a request for type list from another device (e.g., second device 130 as described above) through BTLE or other connection 602. First device 120 may send the type list for the pasteboard 126 using BTLE or other connection in response 604. The requesting device (e.g., second device 130) may send a request for pasteboard data of a specified type, as described above, and first device 120 may receive this request through BTLE or other connection 606. In response to this request, first device 120 may initiate transfer of the requested data from pasteboard 126.

In some embodiments, mode of data transfer from pasteboard 126 of first device 120 to pasteboard 136 of second device 130 may depend on the size of the data being transferred. For example, a threshold data size may be established (e.g., 10 kB or some other size). In some embodiments, the threshold data size may be a default size or may be a selectable size specified by a user through interaction with a GUI. First device 120 may determine whether the requested pasteboard data to be sent is below the threshold size 608. If so, the requested pasteboard data may be sent using BTLE (or another low energy connection, e.g., the connection used to send advertisements) 610. If not, first device 120 may use a different (e.g., higher energy) connection to send the data.

For example, first device 120 and second device 130 may establish a direct WiFi connection between one another to transfer larger amounts of data. First device 120 may make available a WiFi service connection and broadcast a WiFi service availability advertisement using BTLE or other connection 612. Second device 130 may connect to the WiFi service provided by first device 120 (see FIG. 7), and the connection between the two devices may be established 614. Once the connection is established, first device 120 may send pasteboard contents to second device 130 using the WiFi connection 616. In some embodiments, the WiFi service established between the devices 120/130 may coexist with network 100 WiFi through the use of time division or other multiplexing techniques, for example allowing devices 120/130 to continue to communicate with router 150 during the data transfer.

Figure 7:
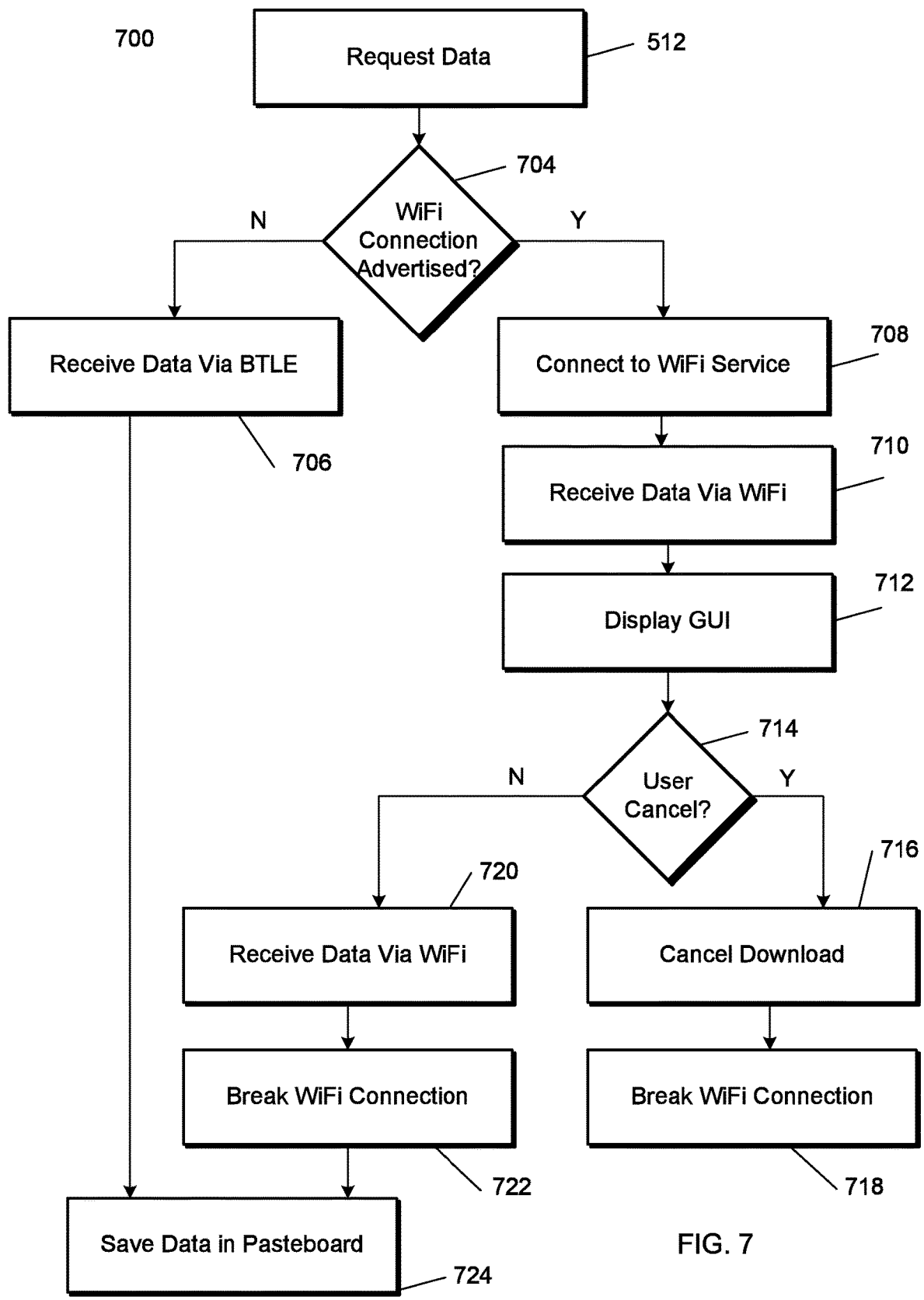
FIG. 7 is a flow diagram of an example process for sending cut or copied data above a threshold size to another device.

FIG. 7 is a flow diagram of an example data transfer process 700 involving a second device 130. While this process 600 is presented as being performed by the second device 130, any device in network 100 may behave similarly to receive pasteboard data from another device (e.g., first device 120 as described above with respect to FIG. 6). Second device 130 may request data (e.g., as described above with respect to FIG. 5) 512. If second device 130 does not detect a WiFi service advertisement 704, it may instead receive pasteboard data from first device 120 sent in response to the request 706.

However, if second device 130 detects a WiFi service advertisement 704, it may connect to first device 120 through the advertised WiFi service 708. As discussed above with respect to FIG. 6, once the connection is established, first device 120 may send pasteboard data through the connection, and second device 130 may receive the data 710. In some embodiments, second device 130 may display a GUI 712 while the pasteboard data is being transferred. The GUI may include an indication of data transfer progress (e.g., a percentage complete and/or progress bar) and/or an option to cancel the transfer (e.g., a "cancel" button). If the cancel button is selected by a user 714, second device 130 may stop the data transfer 716 and, in some embodiments, break the WiFi service connection 718. Otherwise, second device 130 may receive the pasteboard data through WiFi 720 and, in some embodiments, break the WiFi service connection after the transfer is complete 722. In some embodiments, the WiFi service connection need not be broken 718/722 and may remain open for some predetermined period of time, may be used to facilitate future pasteboard data exchanges, and/or may be used for other functions.

Whether the pasteboard data is received through BTLE or WiFi, after the transfer is complete, second device 130 may save the data in its own pasteboard 724 and paste it into an application in response to the user's original paste command. The data may remain in the second device pasteboard 136 as if it had been originally cut or copied locally on second device 130.

Graphical User Interfaces

This disclosure above describes various Graphical User Interfaces (GUIs) for implementing various features, processes or workflows. These GUis can be presented on a variety of electronic devices including but not limited to laptop computers, desktop computers computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 8:
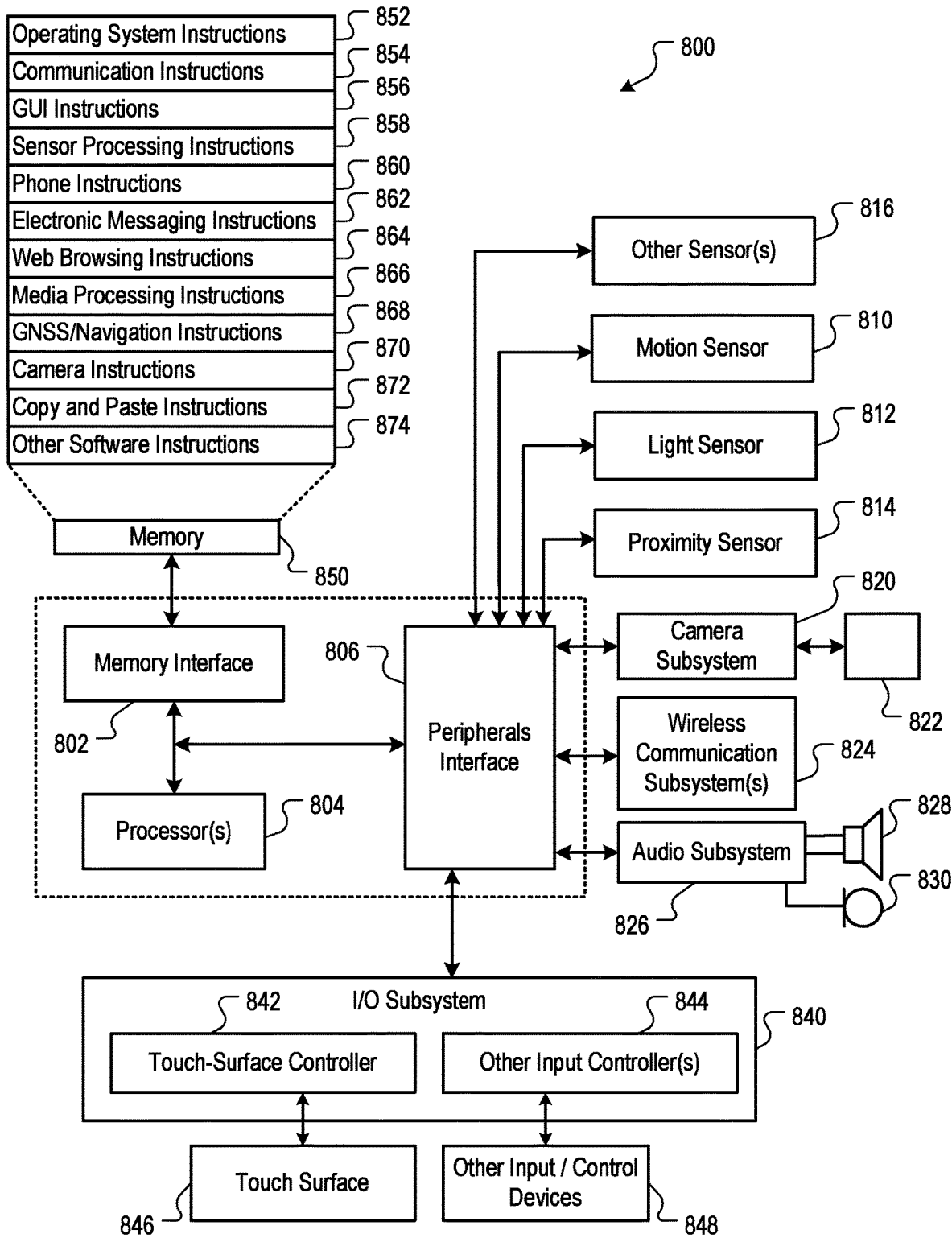
FIG. 8 is an example device configured for copying and pasting between devices.

FIG. 8 is a block diagram of an example computing device 800 that may implement the features and processes of FIGS. 1-7. For example, computing device 800 may serve as one or more user devices 110-140 of network 100. The computing device 800 may include a memory interface 802, one or more data processors, image processors, and/or central processing units 804, and a peripherals interface 806. The memory interface 802, the one or more processors 804, and/or the peripherals interface 806 may be separate components or may be integrated in one or more integrated circuits. The various components in the computing device 800 may be coupled by one or more communication buses or signal lines.

Sensors, devices, and subsystems may be coupled to the peripherals interface 806 to facilitate multiple functionalities. For example, a motion sensor 810, a light sensor 812, anal a proximity sensor 814 may be coupled to the peripherals interface 806 to facilitate orientation, lighting, and proximity functions. Other sensors 816 may also be connected to the peripherals interface 806, such as a global navigation satellite system (GNSS) (e.g., GPS receiver), a temperature sensor, a biometric sensor, magnetometer, or other sensing device, to facilitate related functionalities.

A camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. The camera subsystem 820 and the optical sensor 822 may be used to collect images of a user to be used during authentication of a user, e.g., by performing facial recognition analysis.

Communication functions may be facilitated through one or more wireless communication subsystems 824, which can include radio frequency receivers and transmitters and/or optical (e.g., infrared) receivers and transmitters. For example, the BTLE and/or WiFi communications described above may be handled by wireless communication subsystems 824. The specific design and implementation of the communication subsystems 824 may depend on the communication network(s) over which the computing device 800 is intended to operate. For example, the computing device 800 may include communication subsystems 824 designed to operate over a GSM network, a GPRS network, an EDGE network, a WiFi or WiMax network, and a Bluetooth™ network. In particular, the wireless communication subsystems 824 may include hosting protocols such that the device 800 can be configured as a base station for other wireless devices and/or to provide a WiFi service as described above.

An audio subsystem 826 may be coupled to a speaker 828 and a microphone 830 to facilitate voice-enabled functions, such as speaker recognition, voice replication, digital recording, and telephony functions. The audio subsystem 826 may be configured to facilitate processing voice commands, voiceprinting, and voice authentication, for example.

The I/O subsystem 840 may include a touch-surface controller 842 and/or other input controller(s) 844. The touch-surface controller 842 may be coupled to a touch surface 846. The touch surface 846 and touch-surface controller 842 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of the speaker 828 and/or the microphone 830.

In one implementation, a pressing of the button for a first duration may disengage a lock of the touch surface 846; and a pressing of the button for a second duration that is longer than the first duration may turn power to the computing device 800 on or off Pressing the button for a third duration may activate a voice control, or voice command, module that enables the user to speak commands into the microphone 830 to cause the device to execute the spoken command. The user may customize a functionality of one or more of the buttons. The touch surface 846 can, for example, also be used to implement virtual or soft buttons and/or a keyboard.

In some implementations, the computing device 800 may present recorded audio and/or video files, such as MP3, AAC, and MPEG files. In some implementations, the computing device 800 may include the functionality of an MP3 player, such as an iPod™. The computing device 800 may, therefore, include a 36-pin connector that is compatible with the iPod. Other input/output and control devices may also be used.

The memory interface 802 may be coupled to memory 850. The memory 850 may include high-speed random access memory and/or non-volatile memory, such as one or more magnetic disk storage devices, one or more optical storage devices, and/or flash memory (e.g., NAND, NOR). The memory 850 may store an operating system 852, such as Darwin, RTXC, LINUX, UNIX, OS X, WINDOWS, or an embedded operating system such as VxWorks.

The operating system 852 may include instructions for handling basic system services and for performing hardware dependent tasks. In some implementations, the operating system 852 may be a kernel (e.g., UNIX kernel). In some implementations, the operating system 852 may include instructions for performing voice authentication. For example, operating system 852 may implement the copy and paste features as described with reference to FIGS. 1-7.

The memory 850 may also store communication instructions 854 to facilitate communicating with one or more additional devices, one or more computers and/or one or more servers. The memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNASS and navigation-related processes and instructions; and/or camera instructions 870 to facilitate camera-related processes and functions.

The memory 850 may store copy and paste instructions 872 to facilitate other processes and functions, such as the copy and paste processes and functions as described with reference to FIGS. 1-7.

The memory 850 may also store other software instructions 874, such as web video instructions to facilitate web video-related processes and functions; and/or web shopping instructions to facilitate web shopping-related processes and functions. In some implementations, the media processing instructions 866 may be divided into audio processing instructions and video processing instructions to facilitate audio processing-related processes and functions and video processing-related processes and functions, respectively.

Each of the above identified instructions and applications may correspond to a set of instructions for performing one or more functions described above. These instructions need not be implemented as separate software programs, procedures, or modules. The memory 850 may include additional instructions or fewer instructions. Furthermore, various functions of the computing device 800 may be implemented in hardware and/or in software, including in one or more signal processing and/or application specific integrated circuits.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(±). Claims that do not expressly include the phrase "means for" or "step for" are not to be interpreted under 35 U.S.C. 112(±).

What we claimed is:

1. A method comprising:
    receiving, at a second device, a command to paste data;
    wirelessly receiving, at the second device, a first advertisement comprising information indicative of data of a first device being available;
    responsive to the first advertisement: establishing, with the second device, at least one peer-to-peer connection between the second device and the first device;
    transmitting, by the second device, a request for data to the first device; and
    wirelessly receiving, at the second device, the data from a first pasteboard of the first device through the at least one peer-to-peer connection.

2. The method as recited in claim 1, further comprising:
    prior to receiving the data, wirelessly transmitting, with the second device, a request for a type list to the first device, the type list comprising a plurality of data types of a plurality of subsets of the data on the first pasteboard; and
    breaking, at the second device, the at least one peer-to-peer connection between the first device and the second device in response to completing transfer of the data from the first pasteboard.

3. The method as recited in claim 2, further comprising:
    wirelessly receiving, at the second device, the type list directly from the first device;
    selecting, with the second device, at least one of the plurality of data types as the data to be transmitted; and
    wirelessly transmitting, with the second device, a response including a selection of the data to be transmitted to the second device prior to receiving the data.

4. The method as recited in claim 1, further comprising:
    wirelessly receiving, at the second device, a second advertisement of an available WiFi service from the first device;
    wirelessly responding, with the second device, to the second advertisement with a request to connect to the available WiFi service from the first device; and
    establishing, with the second device, a direct WiFi connection between the first device and the second device.

5. The method as recited in claim 4, wherein the first advertisement is received using a direct, peer-to-peer Bluetooth low energy transmission.

6. The method as recited in claim 5, further comprising displaying, with the second device, a user interface while the data from the first pasteboard is being received, the user interface comprising information selected from a group comprising: an indication of data receipt progress, and a cancel option.

7. The method as recited in claim 6, further comprising:
    receiving, at the second device, a cancel command via the user interface;
    stopping, with the second device, receipt of the data from the first pasteboard in response to receiving the cancel command; and
    breaking, at the second device, the direct WiFi connection between the first device and the second device upon stopping receipt of the data from the first pasteboard.

8. The method as recited in claim 1, wherein the first pasteboard is a data storage element configured to store data and facilitate cut, copy, and paste operations for the data, the method further comprising:
    placing, with the second device, the data in a second pasteboard of the second device in response to completing transfer of the data from the first pasteboard; and
    pasting, with the second device, the data from the second pasteboard.

9. The method as recited in claim 1, wherein the first advertisement is received using a Bluetooth low energy transmission, and wherein the at least one peer-to-peer connection is chosen by the first device based on a size of the data from the first pasteboard.

10. The method as recited in claim 9, wherein the at least one peer-to-peer connection is a Bluetooth low energy connection in response to the size of the data from the first pasteboard being less than a threshold, and wherein the at least one peer-to-peer connection is a direct WiFi connection between the first device and the second device in response to the size of the data from the first pasteboard being at least as great as the threshold.

11. A device, comprising:
at least one wireless transceiver;
a memory configured to store a local pasteboard; and
a processor configured for:
receiving, at a second device, a command to paste data;
wirelessly receiving, at the second device, a first advertisement comprising information indicative of data of a first device being available;
responsive to the first advertisement: establishing, with the second device, at least one peer-to-peer connection between the second device and the first device;
transmitting, by the second device, a request for data to the first device; and
wirelessly receiving, at the second device, the data from a first pasteboard of the first device through the at least one peer-to-peer connection.

12. The device as recited in claim 11, wherein the processor is further configured for:
prior to receiving the data, wirelessly transmitting, using the at least one wireless transceiver, a request for a type list to the first device, the type list comprising a plurality of data types of a plurality of subsets of the data on the first pasteboard; and
breaking, at the second device, the at least one peer-to-peer connection between the first device and the second device in response to completing transfer of the data from the first pasteboard.

13. The device as recited in claim 12, wherein the processor is further configured for:
wirelessly receiving, using the at least one wireless transceiver, the type list directly from the first device;
selecting at least one of the plurality of data types as the data to be transmitted; and
wirelessly transmitting, using the at least one wireless transceiver, a response including a selection of the data to be transmitted to the second device prior to receiving the data.

14. The device as recited in claim 11, wherein the processor is further configured for:
wirelessly receiving, at the second device, a second advertisement of an available WiFi service from the first device;
wirelessly responding, with the second device, to the second advertisement with a request to connect to the available WiFi service from the first device; and
establishing, with the second device, a direct WiFi connection between the first device and the second device.

15. The device as recited in claim 14, wherein the first advertisement is received using a direct, peer-to-peer Bluetooth low energy transmission.

16. The device as recited in claim 15, wherein the processor is further configured for displaying a user interface while the data from the first pasteboard is being received, the user interface comprising information selected from a group comprising: an indication of data receipt progress, and a cancel option.

17. The device as recited in claim 16, wherein the processor is further configured for:
receiving a cancel command from the user interface;
stopping receipt of the data from the first pasteboard in response to receiving the cancel command; and
breaking, using the at least one wireless transceiver, the direct WiFi connection between the first device and the second device upon stopping receipt of the data from the first pasteboard.

18. The device as recited in claim 11, wherein the first pasteboard is a data storage element configured to store data and facilitate cut, copy, and paste operations for the data, and wherein the processor is further configured for:
placing the data in a second pasteboard of the second device in response to completing transfer of the data from the first pasteboard; and
pasting the data from the second pasteboard.

19. The device as recited in claim 11, wherein the first advertisement is received using a Bluetooth low energy transmission, and wherein the at least one peer-to-peer connection is chosen by the first device based on a size of the data from the first pasteboard.

20. The device as recited in claim 19, wherein the at least one peer-to-peer connection is a Bluetooth low energy connection in response to the size of the data from the first pasteboard being less than a threshold, and wherein the at least one peer-to-peer connection is a direct WiFi connection between the first device and the second device in response to the size of the data from the first pasteboard being at least as great as the threshold.

* * * * *